Feb. 2, 1932. E. BRAINICH 1,843,382
TANK CAR FOR CONVEYING VOLATILE LIQUIDS
Filed July 22, 1930 2 Sheets-Sheet 1

Inventor:
Ernst Brainich
Attorneys

Feb. 2, 1932. E. BRAINICH 1,843,382
TANK CAR FOR CONVEYING VOLATILE LIQUIDS
Filed July 22, 1930 2 Sheets-Sheet 2
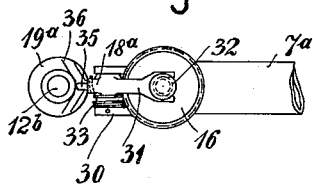
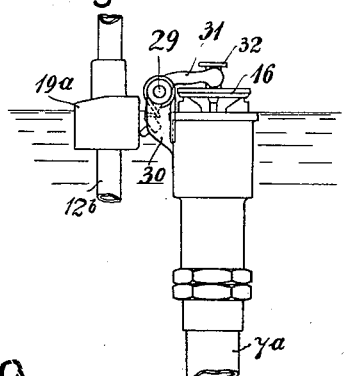
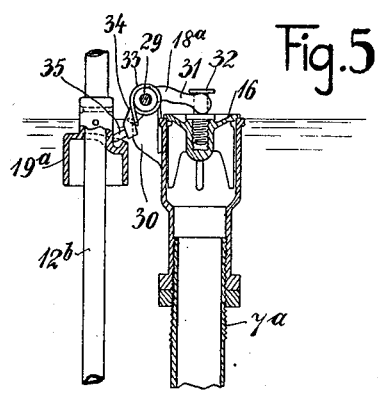
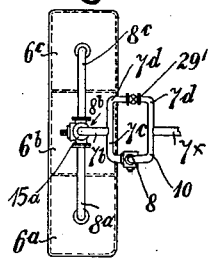
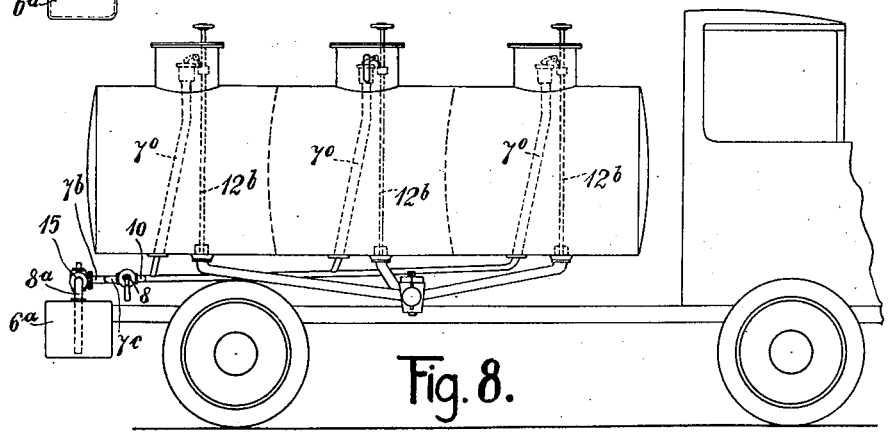
Inventor
Ernst Brainich
By Langner, Parry, Card & Langner
Attorneys Patented Feb. 2, 1932　　　　　　　　　　　　　　　　　1,843,382

UNITED STATES PATENT OFFICE

ERNST BRAINICH, OF WANDSBEK, NEAR HAMBURG, GERMANY

TANK CAR FOR CONVEYING VOLATILE LIQUIDS

Application filed July 22, 1930, Serial No. 469,907, and in Germany August 22, 1929.

This invention relates to tank cars for conveying liquids, particularly those of a volatile nature such as gasolene, benzol, benzine and others, and the main object is to maintain the quantity of liquid contained in a transportable tank or reservoir at the value agreed upon with a customer or the like while it is being transported from the filling station to the place of delivery.

Means are provided for enabling the seller to replenish the quantity to the original amount when losses have occurred during the transport either by leakage, evaporation, contraction or otherwise. With this object in view, the reservoir, which may be divided into a plurality of compartments or chambers, is connected with an auxiliary chamber, which may contain a sufficient amount of liquid to compensate for any deficiency in the reservoir by pumping an amount equal to that lost from the auxiliary chamber to the reservoir or compartment which requires replenishing. Means may also be provided for permitting the liquid to be returned from the reservoir or compartment into the auxiliary chamber, should the liquid within the reservoir or the compartment have increased during transportation owing to expansion by heat, or should for any reason a surplus of liquid have been inserted in the reservoir or compartment without such liquid having decreased during transportation to the requisite amount. Thus the customer will always be given the correct amount agreed upon.

In the drawings the invention is shown by way of example.

Figure 3:
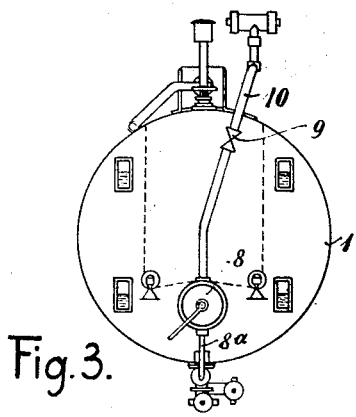

Fig. 3, an end view of the reservoir.

Figure 4:
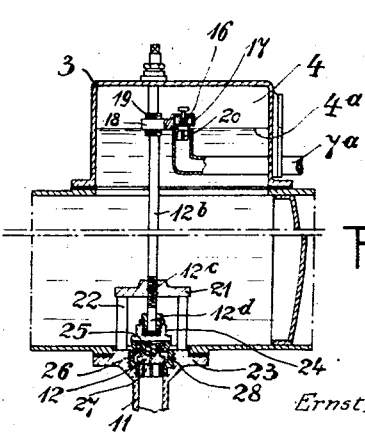

Fig. 4 is a sectional elevation of part of a reservoir or compartment illustrating a modification.

Fig. 5 is a vertical section of means to draw liquid from one chamber to the auxiliary chamber, and Fig. 6, an elevation of the same means in an other position.

Fig. 7 is a plan view of the means shown in Fig. 5.

Figure 1:
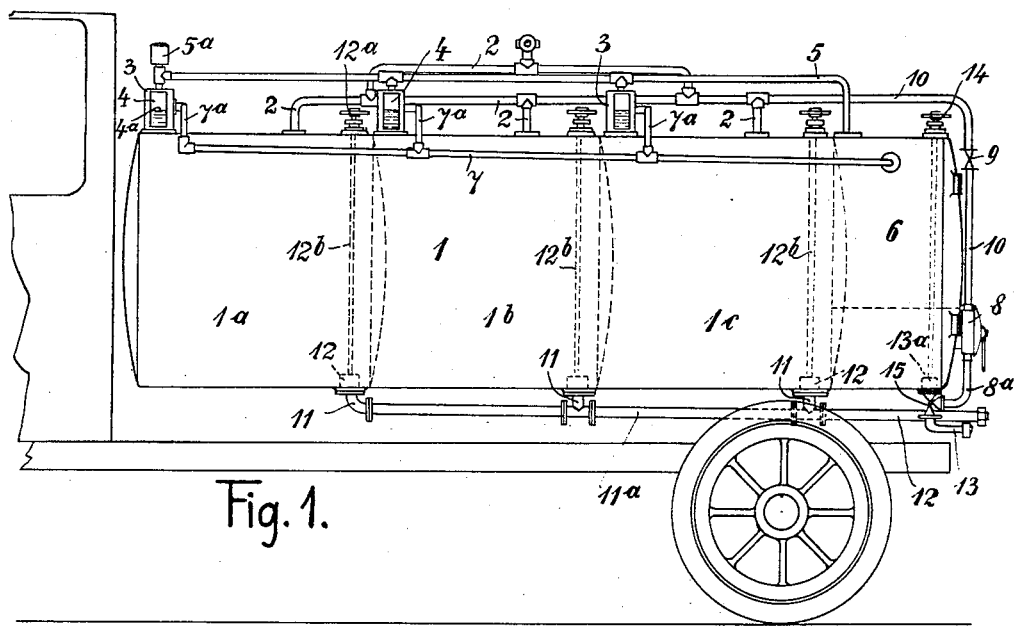
Fig. 1 is an elevation of one part of a tank car carrying the reservoir.

Fig. 8 is an elevation similar to Fig. 1 of a modified tank car, and

Fig. 9, a plan of an auxiliary tank having three compartments and adapted to be used in connection with the tank car shown in Fig. 8.

The reservoir 1 of the tank car in the example illustrated in Fig. 1 is divided into three compartments $1^a$, $1^b$ and $1^c$, which may be filled by means of the pipe system 2. A neck-like dome 3 is mounted on each compartment at its highest point, and is provided with laterally disposed gauge-glasses 4, which may be provided with gauge marks, and which carry vent-pipes 5 and $5^a$. At the end of the reservoir an auxiliary chamber 6 is arranged to which the vent-pipe 5 is also connected at the top.

The tank 1 or one or more of the compartments may be filled with the liquid to be delivered to the customer, up to the gauge-mark $4^a$, the vehicle of course being in horizontal position if the dome and the gauge-glass are arranged at one side of the compartment, as shown in Fig. 1. At the same time the auxiliary chamber may be partially filled through allowing the surplus to run over by the overflow pipe 7, the lower edge of each branch pipe $7^a$ connected with the corresponding dome 3 being at the level of the liquid in the dome 3. This level may be clearly seen in the gauge-glass 4 by the gauge-mark $4^a$. It may be preferable to arrange the overflow at the center of the tank or compartment respectively, as is shown in Fig. 8 hereinafter described. In this case the vehicle need not be in horizontal position for correctly reading the contents of the reservoir or compartment. If the compartments $1^a$, $1^b$, $1^c$ are to be filled with different kinds of liquid each compartment should have a special auxiliary chamber 6. In the construction shown in Figs. 1 to 3 it is assumed that the compartments are filled with the same liquid, and thus only one auxiliary chamber 6 is needed.

Towards the lower end of the auxiliary chamber 6 a pump 8 is mounted connected with the bottom of the auxiliary chamber by a suction pipe $8^a$. The delivery pipe 10 of this pump is provided with a valve 9 connecting it with the pipe system 2 described above. By means of the valve 9 the quantity of liquid forced by the pump into one of the individual compartments 1ª, 1ᵇ, 1ᶜ, can be controlled. Such controlling will be conveniently carried out by observing the gauge-mark on the gauge-glass 4. From the bottom of the tank or the several compartments outlet-pipes 11 branch off, controlled by valves 12, which are operable by hand-wheels 12ª. For draining the auxiliary chamber 6 a pipe 13 is provided, in which a valve 13ª is arranged operable by a hand-wheel 14. The suction pipe 8ª may be connected with the drain pipe 13 by a three-way valve 15.

Means may be provided to allow any surplus liquid within a compartment to be led into the auxiliary chamber 6, when liquid is to be drawn from any compartment. Such means are shown in Fig. 4.

In this case the spindles 12ᵇ of the valves 12 are passed through the domes 3. Each branch pipe 7ª is so connected with its dome 3 that it projects into the dome below the liquid level and is formed in the shape of a bend, its mouth being at the desired level of the liquid, that is, at the same height as the gauge-mark 4ª. This mouth forms the seat of a spring-pressed valve 16, arranged within a bell-shaped cup 17, which latter is provided with a lateral arm 18 perforated and having an inner thread to fit a male thread 19 on the spindle 12ᵇ. By rotating the spindle 12ᵇ the valve 16 may be raised from its seat to allow surplus liquid, which has filled the dome to a level higher than the gauge-mark 4ª, to run off through the pipes 7ª and 7 into the auxiliary chamber 6. To prevent the arm 18 and thus the valve 16 from rotating about the spindle 12ᵇ the valve 16 is provided with depending guide pieces or flanges 20, which fit into the mouth of the overflow tube 7ª.

The spindle 12ᵇ near its lower end 12ᵈ is provided with a thread 12ᶜ projecting through a crosshead 21 having a corresponding inner thread and supported by posts 22 attached to a flange 23 of the outlet pipes 11. The lower end 12ᵈ of the spindle is rotatably journaled in a retaining member 24 of the valve 12. For connecting the retaining member 24 to the valve 12 this latter is provided with a shoulder 25 adapted to be engaged by a shoulder 26 on the retaining member 24, a spring 27 being arranged between the valve 12 and the retaining member 24 and tending to urge the valve 12 downwardly. When the spindle 12ᵇ is so adjusted that the valve 16 rests on the mouth of the overflow pipe 7ª the flange 23 will not contact with the flange 25, but a certain amount of play will be left between the two flanges. When the spindle is to be rotated to open the valve 12, before such opening occurs, first the valve 16 is raised to allow any surplus of liquor that may be within the dome above the gauge-mark 4ª, to run off by the overflow pipe 7ª and pipe 7 into the auxiliary chamber 6 and when the level of the liquid falls down to the gauge mark 4ª, the spindle 12ᵇ on further rotation permits the flange 23 to engage the flange 25, and thereupon to open the valve 12, allowing the liquid to run off through the pipes 11 and 11ª, by which the liquid is delivered to the customer. It is preferable to make the upper thread 19 of greater pitch than the lower thread 12ᶜ, to quickly open the valve 16 to permit the surplus liquid to fully run off into the auxiliary chamber before the valve 12 is opened. The retaining member 24 is adapted to engage the socket 28 in the lowest position of the spindle 12ᵇ and thus of the valve 16, to secure the required space between the flanges 23 and 25. Thus the retaining member 24 is constructed to form a second valve for shutting off the bottom valve. Such a double closure is of importance for a liquid which is as volatile as gasolene, benzol, spirit and benzine.

In the modification shown in the Figs. 5, 6 and 7 special care is taken to open the overflow valve very quickly even on a short turn of the spindle 12ᵇ. The helical screw thread 19 used in the modification described above is substituted by a cylindrical cam 19ª adapted to operate a bell-crank lever 18ª oscillating about a pin 29 on a bracket 30 mounted on the overflow pipe 7ª. The longer arm 31 of the bell-crank lever 18ª is constructed to bear on the valve 16 and is rounded off and bifurcated to engage a mushroom-like projection 32 on the valve. A spring 33 tends to press the arm 31 down on the valve 16 and thus to press this valve down on the mouth of the overflow pipe 7ª which forms a seat for the valve 16. The short arm 34 carries a stud 35 which is engaged by cam 19ª. The cam face 36 of this cam is so shaped that upon rotation of the spindle 12ᵇ the stud 35 is urged towards the overflow pipe 7ª against the action of the spring 33, and the valve 16 is raised as is shown in Fig. 6, allowing all liquid above the line determined by the mouth of the pipe 7ª to run off through this pipe into the auxiliary chamber 6.

It is to be noted that the cylindrical cam 19ª is fixed to the spindle 12ᵇ and has in general a cylindrical outer surface. On its top the cam 19ª has a cam face 36 which may be seen in Figs. 5, 6 and 7. From the middle position of the stud 35 with relation to cam surface 36 a rotation of the spindle 12ᵇ and part 19ª will bring the stud 35 in such position that it engages the outer cylindrical surface of the cam 19ª. As soon as the stud 35 has left the cam surface 36 and is engaging the cylindrical outer surface of part 19ª it takes the position shown in Fig. 6 in which the valve 16 is held open on further rotation of the spindle 12ᵇ, due to the cam 19ª moving vertically with the spindle. When the spindle 12ᵇ is rotated backwardly and after the bottom valve has been closed the overflow valve 16 should also be closed. This will be effected by the rotation of the spindle 12ᵇ which brings the part 19ᵃ in such position that the stud 35 again reaches the edge of the cam surface 36 and is shifted along this cam surface by further turning movement of spindle 12ᵇ. This causes the closing of overflow valve 16, which position is shown in Fig. 5, whereas Fig. 6 shows valve 16 in open position.

A comparison of the position of part 19ᵃ shown in these two figures will show the effect of the above described movements. As long as the stud 35 engages cam surface 36 the cam 19ᵃ is entirely underneath the fluid level 16 as shown in Fig. 5. The spindle 12ᵇ is in the lower-most position whereby both the overflow valve 16 and the bottom valve 12 are closed. In Fig. 6 on the other hand a portion of cam 19ᵃ is above the fluid level because the spindle 12ᵇ has been rotated in an upward direction so that the valve 16 may open.

From the drawings it will be seen that a rotation through 90° is sufficient to force the stud 35 a sufficient distance to bear against the cylindrical outer surface of the cam. The stud 35 and thus the valve 16 is held in this position during further rotation of the spindle 12ᵇ. Very soon afterwards, say upon further rotation of 360°, the bottom valve 12 opens. But since there is sufficient play, this opening is not effected until the spindle is turned to the extent described, whereupon the liquid is allowed to run into the pipe 11ᵃ, which will be connected with the tank of the customer, not shown in the drawings.

Not until the bottom valve 12 is closed by backward rotation of the spindle can the overflow valve 16 also be closed by the stud 35 sliding back along the cam surface 36, the cam 19ᵃ itself having been sufficiently moved downwards to allow the stud 35 to enter the cam surface 36, Fig. 7.

Figure 2:
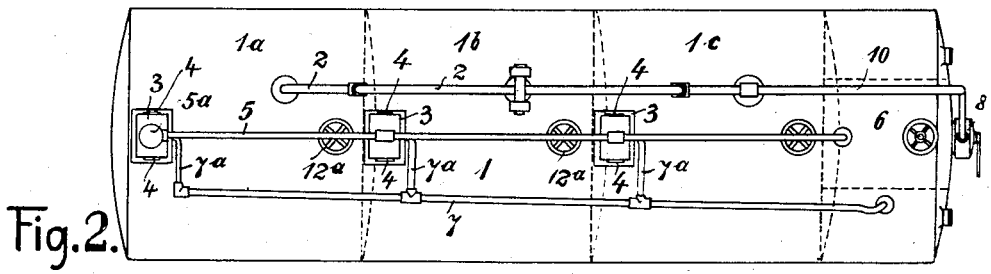
Fig. 2 is a plan view.

In the construction shown in Figs. 8 and 9, in which the overflow system shown in Figs. 5–7 is used by way of example, it is assumed that the auxiliary tank is arranged on the truck below the main tank or reservoir. This permits simplifying the complete pipe system which is arranged below the tank instead of on top, as shown in Figs. 1–3. It is also assumed that the auxiliary tank is divided into compartments 6ᵃ, 6ᵇ and 6ᶜ, corresponding in number to the compartments 1ᵃ, 1ᵇ and 1ᶜ of the main tank. The overflow pipes 7° in this case run directly through the compartments is shown and may also be employed for introducing liquid from the auxiliary chambers which are connected by pipes 8ᵃ, 8ᵇ and 8ᶜ to a four-way cock 15ᵃ from which branches off the pipe 7ᵇ, and which may be adjusted to allow the pipe 7ᵇ to communicate with either of the three pipes 8ᵃ, 8ᵇ or 8ᶜ, as may be required.

From the pipe 7ᵇ two pipes 7ᶜ and 7ᵈ branch off, one 7ᶜ leading to the pump 8, and the other 7ᵈ to a shut-off valve 29'. The delivery pipe 10 of the pump 8 and the other pipe 7ᵈ lead into a connecting pipe 7ˣ connected by branches to the overflow pipes 7° within the different compartments.

When it is desired to draw liquid from one compartment, say 6ᵃ, into the corresponding compartment 1ᵃ of the main tank, the four-way cock 15ᵃ will be so set that the pipe 8ᵃ communicates with the pipe 7ᵇ, and the overflow valve 16 in the compartment 1ᵃ is opened by giving the spindle 12ᵇ a slight turn (about 90°) but which is insufficient to also open the valve 12. Then by operating the pump 8, the valve 29 being closed, liquid will be forced from the auxiliary chamber 6ᵃ into the compartment 1ᵃ. It is to be noticed that the springs 33 must be strong enough to keep the valves 16 of the other main compartments closed against the pressure exerted by the pump.

It will be well understood that different liquids may be filled into the different main compartments, and that the same different liquids must be inserted in sufficient amount into the corresponding auxiliary chambers.

I claim:—

1. A liquid dispensing device comprising a reservoir opening at the top to the atmosphere, a dome mounted at the top thereof, a liquid gauge connecting with said dome and having a mark thereon indicating the level to which the reservoir is to be filled, an auxiliary tank, means for transferring liquid from the auxiliary tank into the reservoir, an overflow pipe for drawing off liquid from the reservoir above the level indicated by the mark, and connected with the auxiliary tank to permit the excess liquid to flow into the said auxiliary tank, an outlet pipe at the bottom of the reservoir for the removal of the measured quantity of liquid, a valve for closing the mouth of the overflow pipe, a second valve adapted to close the outlet pipe, and means for actuating both the first mentioned and the second mentioned valves, the said means being adapted to open the first mentioned valve before it opens the second mentioned valve.

2. A liquid dispensing device comprising a reservoir opening at the top to the atmosphere, a dome mounted at the top thereof, a liquid gauge connecting with said dome and having a mark thereon indicating the level to which the reservoir is to be filled, an auxiliary tank, means for transferring liquid from the auxiliary tank into the reservoir, an overflow pipe for drawing off liquid from the reservoir above the level indicated by the mark, and connected with the auxiliary tank to permit the excess liquid to flow into the said auxiliary tank, an outlet pipe at the bottom of the reservoir for the removal of the measured quantity of liquid, a valve for closing the mouth of the overflow pipe, a second valve for closing the outlet pipe, and means for actuating both the first mentioned valve and the second mentioned valve, the said means being adapted to open the first mentioned valve before it opens the second mentioned valve, the said means comprising a valve spindle extending through the dome, and carrying the second mentioned valve at its lower end and having at its upper end means whereby it is connected to the first mentioned valve.

3. A liquid dispensing device comprising a reservoir opening at the top to the atmosphere, a dome mounted at the top thereof, a liquid gauge connecting with said dome and having a mark thereon indicating the level to which the reservoir is to be filled, an auxiliary tank, means for transferring liquid from the auxiliary tank into the reservoir, an overflow pipe for drawing off liquid from the reservoir above the level indicated by the mark, and connected with the auxiliary tank to permit the excess liquid to flow into the said auxiliary tank, an outlet pipe at the bottom of the reservoir for the removal of the measured quantity of liquid, a valve for closing the mouth of the overflow pipe, a second valve for closing the outlet pipe, and means for actuating both the first and second valves and being adapted to open the first valve in advance of the second valve, the said means comprising a valve spindle extending through the dome, a retaining member for the outlet valve mounted at the lower end of the spindle, the said retaining member having an inwardly turned flange, and the outlet valve having a flange adapted to be engaged by the first mentioned flange, the two flanges being spaced from each other when the outlet valve is closed, and means at the upper end of the spindle for operatively connecting the said spindle with the first valve.

4. A liquid dispensing device comprising a reservoir opening at the top to the atmosphere, a dome mounted at the top thereof, a liquid gauge connecting with said dome and having a mark thereon indicating the level to which the reservoir is to be filled, an auxiliary tank, means for transferring liquid from the auxiliary tank into the reservoir, an overflow pipe for drawing off liquid from the reservoir above the level indicated by the mark, and connected with the auxiliary tank to permit the excess liquid to flow into the said auxiliary tank, an outlet pipe at the bottom of the reservoir for the removal of the measured quantity of liquid, a valve for closing the mouth of the overflow pipe, a second valve for closing the outlet pipe, and means for actuating both the first and second valves and adapted to open the first valve in advance of the second valve, the said means comprising a valve spindle extending through the dome, and carrying the second valve at its lower end, a cam carried at the upper end of the spindle, and a spring pressed lever pivotally mounted on the overflow pipe and operatively connecting at one end thereof with the first valve and at the other end with the said cam.

In testimony whereof I have signed my name to this specification.

ERNST BRAINICH.